Aug. 15, 1939.  J. B. KASTEN  2,169,533
MICROMETER LEVELING DEVICE
Filed May 18, 1938  2 Sheets-Sheet 1
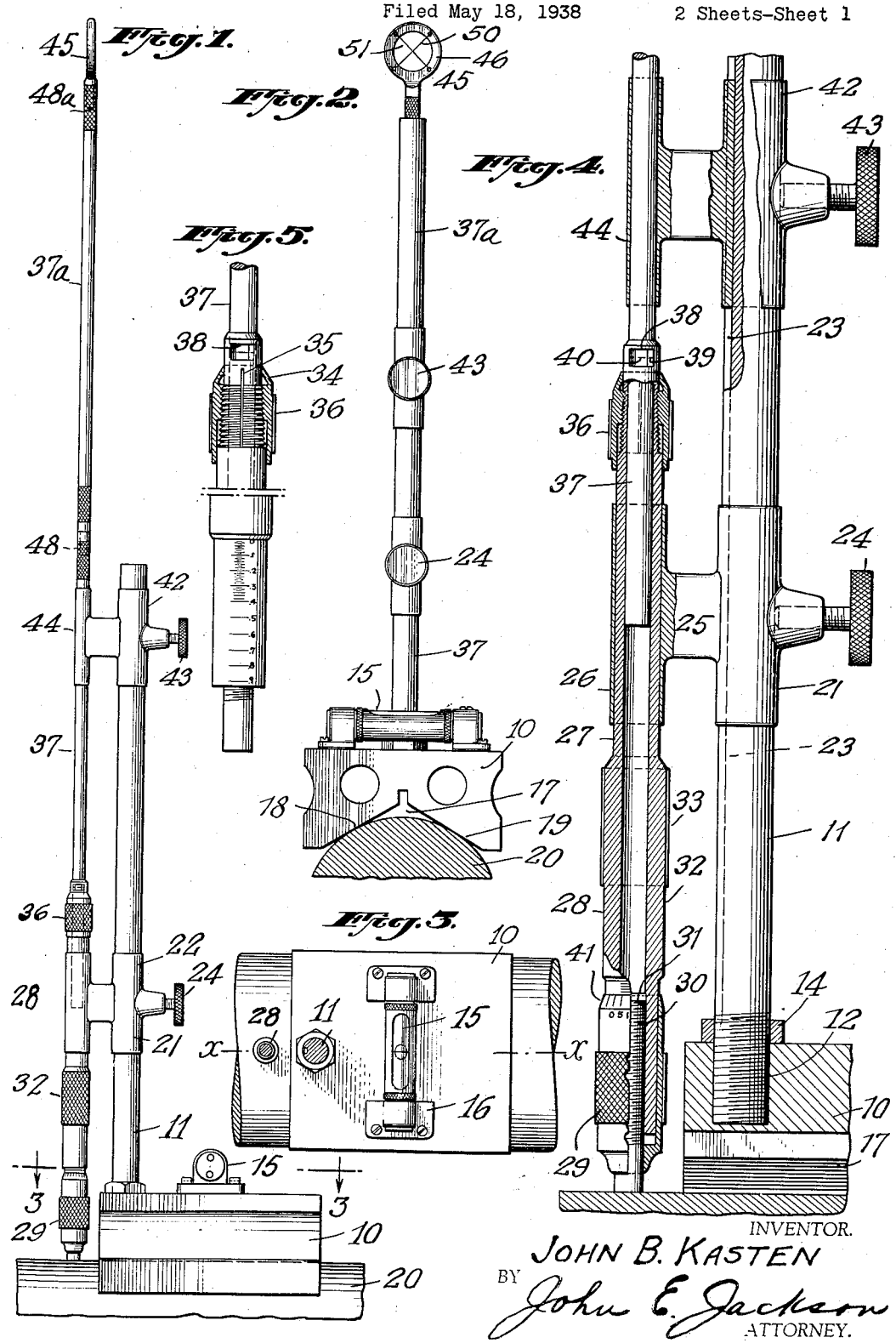
INVENTOR.
JOHN B. KASTEN
BY John E. Jackson
ATTORNEY.

Aug. 15, 1939     J. B. KASTEN     2,169,533
MICROMETER LEVELING DEVICE
Filed May 18, 1938     2 Sheets-Sheet 2
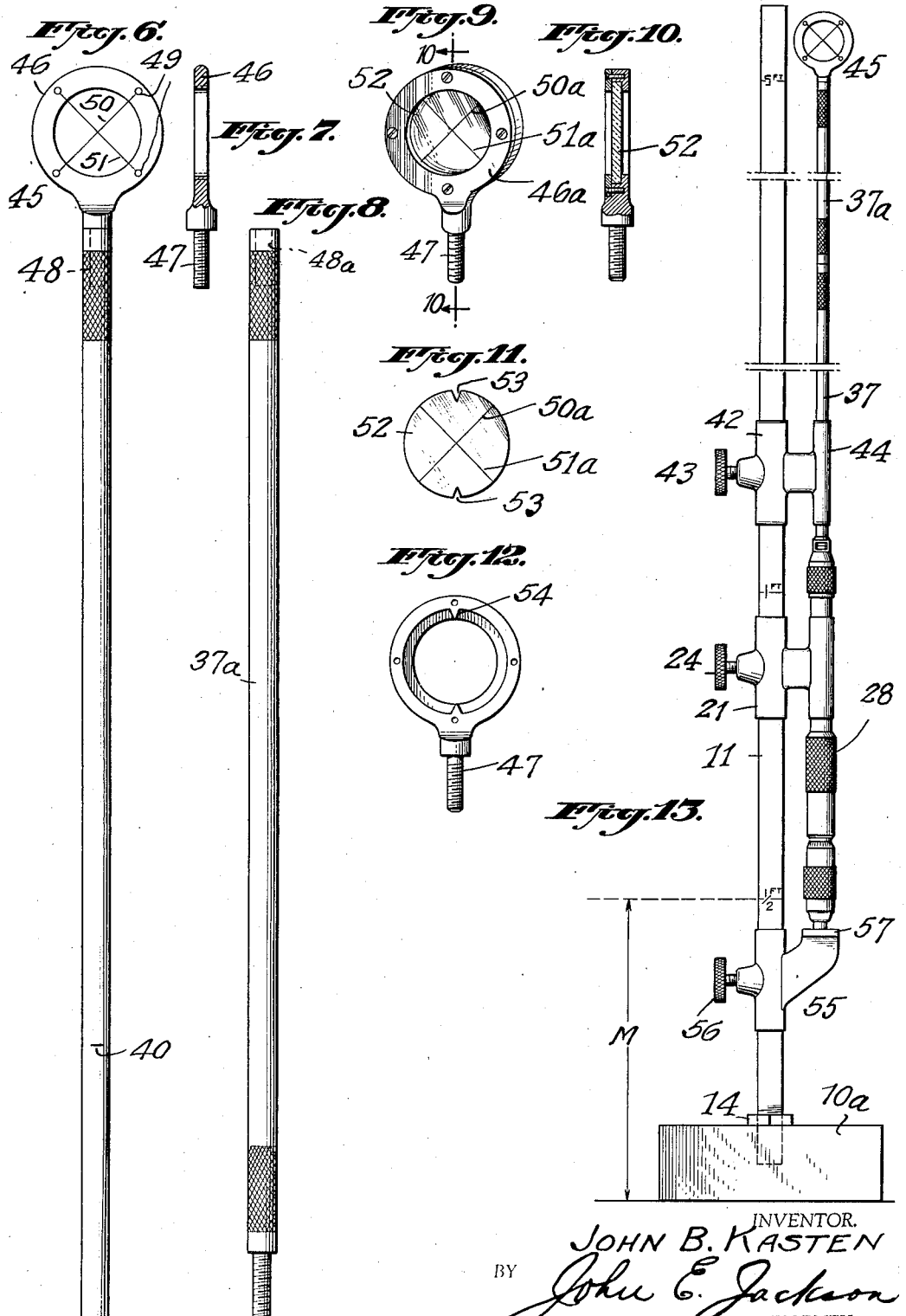
INVENTOR.
JOHN B. KASTEN
BY John E. Jackson
ATTORNEY.

Patented Aug. 15, 1939

2,169,533

UNITED STATES PATENT OFFICE 2,169,533

MICROMETER LEVELING DEVICE

John B. Kasten, Fairfield, Ala.

Application May 18, 1938, Serial No. 208,706

8 Claims. (Cl. 33—46)

This invention relates to improvements in a precision device for determining levels or accurately measuring distances from given locations or bench marks.

While not limited thereto, the embodiment of the invention illustrated is well suited for leveling machinery bases, line shafts and various types of machinery, whether it is set from leveling pads or from shafting.

It is relatively simple to line a machine or mill by using a fine wire stretched tightly between battens, but to level a base or a shaft in proper and precise relation to other machines or parts of the same machine is a very difficult matter. This is particularly true with respect to large rolling mill or machine shop equipment.

By the utilization of my invention which comprises the combination of coacting instrumentalities hereafter described, illustrated and claimed, machine parts can be readily and accurately leveled, aligned or set up in various desired predetermined relations.

For a more complete disclosure of the invention reference should be made to the accompanying drawings, the following detailed description and the appended claims.

In the drawings:

Figure 1 is a side elevation illustrating the use of a device embodying my invention in leveling or aligning shafting;

Figure 2 is a view at right angles to Figure 1 with one of the parts shown in a different relative position of adjustment;

Figure 3 is a horizontal section on line III—III of Figure 1;

Figure 4 is a view similar to Figure 1 on a much larger scale, with certain of the parts shown in vertical, longitudinal section to reveal interior structural details;

Figure 5 is a fragmentary detail illustrating clamping means for adjustably positioning a target sight-supporting rod;

Figure 6 is an enlarged view of a supporting rod having sight means in the form of a target secured thereto;

Figure 7 is a detached side view of the target shown in face view in Figure 6;

Figure 8 is a detail of an extension rod;

Figure 9 is a perspective of an alternative form of target;

Figure 10 is a detailed section thereof on line X—X of Figure 9;

Figures 11 and 12 are, respectively, detailed views of a target sight glass and a support therefor; and, Figure 13 is a view similar to Figure 1 illustrating an alternative embodiment of the invention.

Referring in detail to the drawings, 10 represents a base block to which an upright standard 11 is secured by means of coacting screw threads 12 formed on the end of a rod which engages similar threads in the base. Standard 11 is locked in position by means of a nut 14 threaded on the shank thereof. Secured to the upper face of the base 10 there is a bubble indicator 15 which is positioned by brackets 16 suitably mounted on the base 10. This bubble indicator provides means whereby the operator can determine accurately when the base 10 is in a truly level position.

When the device is to be used for establishing levels of shafting or for measuring the relation of a given shaft to other objects, the base will have a V-notch 17 formed in the under side thereof. The oppositely inclined faces 18 and 19 of the V-notch will make an equal angle with a truly vertical or plumb line passing through the center of a shaft 20 from which measurement is to be taken. A vertical plane passing through the bi-sector of the angle included between the faces 18 and 19 will pass through the axis of the shaft 20. The axis of the standard 11 will coincide with this plane, as indicated by the line X—X in Figure 3. The center of the bubble indicator will preferably also be intersected by the plane X—X in Figure 3.

Spaced from the standard 11, but aligned with the plane indicated by line X—X, means are provided for supporting a micrometer with freedom for vertical movement relative to the upright. These means include a bracket indicated generally at 21 which has a hub portion 22 slidable along the upright 11 and provided with a suitable spline which rides in a spline groove 23 extending longitudinally of the upright. A thumb-screw 24 serves to adjustably hold the bracket 21 in various desired positions of vertical adjustment. An arm 25 extending laterally from the hub of the bracket has a sleeve portion 26 through the center of which extends a guide portion 27 of a micrometer indicated, as a whole, at 28. This micrometer consists essentially of three main parts, namely, a lower thumb-piece 29, a feed-screw 30 and a body 32, the screw engaging interior threads 31 formed in the bore of the body. This body 32 has a knurled portion 33 to facilitate the turning of the thumb-piece 29 relative thereto. At its upper end the micrometer body is provided with a tapered, screw-threaded portion 34 which is kerfed, as at 35, to provide a certain resiliency so that when a clamp member 36 is screwed downwardly on the threaded portion, the upper extremity of the micrometer body will be constricted to thus tightly grip the end of a rod 37 projecting into the central bore of the micrometer body. The upper portion of the micrometer body has a window 38 formed therein having a marker 39 adapted to serve as an index means for positioning a selected one of various graduation marks 40 formed on the rod 37. The graduations 40 may be spaced in inches or fractions thereof, or in meters and millimeters, or according to any other suitable table of measurement. Thus by adjusting the rod and clamping it to the micrometer, a rough approximation of a vertical distance to be measured can readily be made; and by screwing the thumb-piece 29 relative to the body portion 32, an extremely precise adjustment can be made, even down to a thousandth or smaller part of an inch, it being known to those familiar with micrometer construction that this accuracy of adjustment is readily secured by dividing the fine pitch of the micrometer screw 30 into a predetermined number of units and the reading being taken by the vernier 41 on the micrometer.

For accurate positioning of the rod 37 in true axial vertical alignment with the axis of the micrometer, and, therefore, also in true parallel relationship with the vertical axis of the standard 11, I provide a bracket 42 quite similar to the bracket 21, this bracket 42 also having a positioning thumb-screw 43 and means for engagement with the spline-way 23, and being provided with a sleeve portion 44 through which the rod 37 is freely slidable.

The rod 37 constitutes a support for target sight means, indicated generally at 45. This target sight means may take different forms. In Figures 1, 2, 6 and 7, the target or sight comprises a substantially circular rim 46 having a threaded shank 47 adapted to be screwed into either the socket 48 formed in the upper end of the rod 37 or in a similar socket 48ª formed in an extension rod 37ª. The rim 46 has a plurality of fastening means 49 by means of which are secured two very fine wires 50 and 51 arranged perpendicular to one another and disposed preferably at an angle of 45 degrees to a truly plumb line coinciding with the vertical axis of the micrometer.

In a modification of the target means illustrated in Figures 9 to 12 inclusive, the rim 46ª supports a sight glass 52 having two hair lines 50ª and 51ª etched thereon. This sight glass is notched at 53—53 for engagement with locating projections 54 formed on the rim, as best shown in Figure 12.

In the embodiment of the invention shown in Figure 13, the micrometer 28, the standard 11, the rods 37 and 37ª and the target supported thereby are identical with the similar parts described in connection with Figures 1 to 12 inclusive. In this embodiment of the invention, however, the base is in the nature of a simple prismatic block or slab 10ª adapted to rest on a machine base or other flat surface from which a measurement is to be taken. In this embodiment of the invention an adjustable micrometer rest, indicated at 55, is provided and adapted to be positioned at any desired vertical distance along the standard and held in its adjusted position by a a thumb-screw 56. This rest has a shelf extension 57 thereon for engagement with the lower extremity of the micrometer, as will be readily understood.

From the above detailed description of the embodiments of the invention illustrated, it is believed that the manner of using the device will be readily apparent. By way of example, however, in the use of the device as shown in Figure 1, the approximate distance to be measured is set by clamping the rod 37 to the micrometer by tightening the clamp 36, the reading on the rod being taken through the window 38 in the upper end of the micrometer. Fine adjustments are then made by turning the thumb-piece 29 of the micrometer relative to the body portion 32, and the elevation at the point of intersection of the cross wires 50 and 51 (the hair lines 50ª and 51ª) is determined by the use of a conventional form of surveyor's leveling instrument.

In the example illustrated in Figure 1, the readings are taken from the top of the shaft. In the event different portions of the shaft are of different diameter, which frequently is the case, the various diameters can be accurately callipered and correction made for this difference by manipulation of the micrometer. Thus the shaft, whether of uniform diameter throughout its length or otherwise, may be leveled or accurately brought to proper elevation.

In the use of the device as illustrated in Figure 13, the standard 11 is graduated; for example, the distance M being six inches or one-half foot measured from the under surface of the base, which is considered as the zero point. The uppermost face of the shelf extension 57 is set at the required elevation (for example, as measured by the graduation on the standard 11) and the micrometer readings are taken from the upper face of the shelf 57. The arrangement of Figure 13 gives a relatively greater range in height, such as is frequently required in the leveling of base plates and the like, and provides a very stable device capable of maintaining the upright in position with its vertical axis truly plumb or perpendicular to a precise level surface.

Although I have described quite precisely certain embodiments of the invention herein illustrated, it is not to be construed that I am limited thereto, since various modifications and substitutions of equivalents may be made by those skilled in the art without departure from the invention, as set forth in the appended claims.

I claim:

1. A device of the character described comprising a base block, a bubble level-indicator carried thereby, a standard whose longitudinal axis is exactly perpendicular to the axis of the bubble indicator, a bracket slidably mounted on the standard carrying means effective to secure it in various positions of adjustment along the standard, a micrometer having an axial guide portion, means carried by the bracket for positioning said guide portion in parallelism with the longitudinal axis of the standard, a clamp member carried by the guide portion of the micrometer, a rod securable by said clamp member in coaxial alignment with said guide portion effective to hold the rod in various positions of axial adjustment, a second bracket adjustable along the upright and carrying a guide sleeve for said rod, and sight means supported by said rod.

2. A device of the character described comprising a base block, a bubble-indicator secured thereto whose longitudinal axis in its normal operative position coincides with a truly horizontal plane, a standard secured to the base with its vertical axis perpendicular to said indicator, a micrometer, means slidably engaging the standard and having a portion for holding the micrometer parallel thereto, a target-carrying rod supported by the micrometer, and guide means for the rod slidably supported by said standard.

3. A device of the character described comprising a base block, a bubble level-indicator carried thereby, a standard whose vertical longitudinal axis is perpendicular to the axis of the bubble indicator, a micrometer including coacting parts having a screw-threaded connection whereby they are adjusted relatively, one of said parts being adapted to engage a member from which a measurement is to be taken, the other of said parts having a guide portion and a clamp member, a bracket on said standard slidably supporting said guide portion, a rod secured to the micrometer by said clamp and a target supported by said rod.

4. A device of the character described comprising a base block carrying a bubble level-indicator, a standard whose vertical longitudinal axis is perpendicular to the axis of the bubble indicator, a micrometer including two parts having a screw-threaded connection whereby they are adjusted relatively, one of said parts being adapted to engage a member from which a measurement is to be taken, the other of said parts having a guide portion and a clamp member, a bracket on said standard slidably supporting said guide portion, a rod secured to the micrometer by said clamp, a target supported by said rod and a guide bracket for said rod adjustably secured to said standard.

5. A device of the character described comprising a base block, a bubble level-indicator secured thereto, said block having a notch with oppositely inclined walls on the underside thereof, the longitudinal axis of said indicator being exactly perpendicular to a plane coinciding with the bi-sector of the angle included by said walls, a standard whose longitudinal axis is exactly perpendicular to the axis of the bubble indicator, a micrometer, means for supporting the same exactly parallel to said axis of the standard, a sight target, a rod supporting the latter, and a clamp on said micrometer for coaction with said rod whereby the latter is securable to the micrometer in various positions of adjustment.

6. A device of the character described comprising a base block carrying a bubble level-indicator and having a notch with oppositely inclined walls on the underside thereof, the longitudinal axis of said indicator being exactly perpendicular to a plane coinciding with the bi-sector of the angle included by said walls, a standard whose longitudinal axis coincides with said plane and is exactly perpendicular to the axis of the bubble indicator, a micrometer, means on the standard for positioning the longitudinal axis of the latter parallel to said axis of the standard in said plane, a rod coaxial with the micrometer carrying sight-means, and respective means engaging the micrometer and the standard, jointly constituting an adjustable support for positioning the rod with its longitudinal axis exactly perpendicular to the axis of the indicator.

7. A device of the character described comprising a base, a level-indicator secured thereto, a standard whose longtiudinal axis is perpendicular thereto, a micrometer juxtaposed to said standard and supported with freedom for movement relative thereto, said micrometer having a tapered, screw-threaded, resilient portion, a member screwing thereon, a rod adjustably secured to the micrometer by coaction of said last named parts, and sight-means detachably secured to said rod.

8. A device of the character described comprising a base carrying a level-indicator, a standard whose longitudinal axis is perpendicular to the axis of said indicator, a hollow elongated micrometer supported by and with its longitudinal axis in parallel juxtaposition to said standard, a rod telescoping within the micrometer, clamp means adjustably securing the rod to the micrometer, coacting means on the micrometer and the rod for facilitating the setting of the rod in predetermined positions of telescoped adjustment within and with respect to the micrometer and sight-means supported by said rod.

JOHN B. KASTEN.